(12) United States Patent
Katayama et al.

(10) Patent No.: US 7,001,474 B2
(45) Date of Patent: Feb. 21, 2006

(54) METHOD FOR MANUFACTURING OPTICAL DISC AND METHOD FOR TRANSPORTING MULTI-LAYERED OPTICAL DISC

(75) Inventors: Kazutoshi Katayama, Odawara (JP); Yoshihisa Usami, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 238 days.

(21) Appl. No.: 10/165,406

(22) Filed: Jun. 7, 2002

(65) Prior Publication Data

US 2002/0185219 A1 Dec. 12, 2002

(30) Foreign Application Priority Data

| Jun. 7, 2001 | (JP) | .............................. 2001-172795 |
| Jun. 12, 2001 | (JP) | .............................. 2001-177407 |
| Apr. 12, 2002 | (JP) | .............................. 2002-110394 |

(51) Int. Cl.
   *G11B 7/26* (2006.01)
(52) U.S. Cl. .................. 156/74; 156/275.5; 156/275.7; 156/556; 156/566
(58) Field of Classification Search ............. 156/272.2, 156/275.5, 275.7, 267, 74, 295, 538, 539, 156/556, 558, 566; 269/47, 52; 369/286
See application file for complete search history.

(56) References Cited

U.S. PATENT DOCUMENTS

| 5,951,806 A | * | 9/1999 | Amo et al. ............... 156/273.5 |
| 6,228,203 B1 | * | 5/2001 | Kotoyori et al. ............ 156/291 |
| 6,685,794 B1 | * | 2/2004 | Shinohara et al. ........ 156/273.1 |
| 6,743,527 B1 | * | 6/2004 | Hisada et al. .......... 428/694 SC |

FOREIGN PATENT DOCUMENTS

JP          04105892 A   *   4/1992

* cited by examiner

*Primary Examiner*—John T. Haran
(74) *Attorney, Agent, or Firm*—J. C. Patents (57) ABSTRACT

A method for manufacturing an optical disc and a method for transporting a multi-layered optical disc are provided. When adhering the sheet and the disc substrate, after the adhesive is supplied to the outer side of the groove on the disc substrate, the sheet is loaded on the disc substrate. The adhesive is pressed to extend to the groove. At this timer, because the surplus adhesive is blocked when flowing into the groove, the surplus adhesive does not overflow easily toward the inner side of the groove. In addition, even if the adhesive overflows toward the inner side of the groove the adhesive is kept between the non-adhered portion of the sheet and the disc substrate, preventing the adhesive from moving to the disc surface. The non-adhered portion is cut by the cutting blade after the adhesive is completely cured, and then removed from the disc substrate.

4 Claims, 8 Drawing Sheets

METHOD FOR MANUFACTURING OPTICAL DISC AND METHOD FOR TRANSPORTING MULTI-LAYERED OPTICAL DISC

CROSS-REFERENCE TO RELATED APPLICATION

This application claims the priority benefit of Japanese application serial no. 2001-172795, filed on Jun. 7, 2001, 2001-177407, filed on Jun. 12, 2001 and 2002-110394 filed on Apr. 12, 2002.

BACKGROUND OF THE INVENTION

1. Field of the Invention

This invention relates in general to a method for manufacturing an optical disc, a disc-shape recording medium, on which at least one of the recording or the reproducing process is performed by using a laser beam. The invention relates to a method for manufacturing an optical disc, wherein the cover layer is formed by adhering a sheet made of transparent resin to a disc substrate. More specifically, the invention relates to a method for transporting a multi-layered disc, wherein in the process of making the optical disc, the multi-layered disc is formed by loading the thin film sheet to the disc substrate through a liquid adhesive.

2. Description of Related Art

Discs for recording or reproducing information by a laser beam, such as a CD-R (Compact Disc-Recordable), a CD (Compact Disc), a DVD (Digital Versatile Disc), or a DVD-R (Digital Versatile Disc-Recordable) etc., have become popular. However, recently, there is a need for storing a large amount of information, such as video information, on disc, and thereby a high-density disc is being studied. The recording density of such a disc is substantially determined by the spot size of the laser beam irradiated on the disc. Assuming that the wavelength of the laser beam is λ and the numerical aperture of the objective lens is NA, the spot size is proportional to λ/NA. Therefore, in order to increase the recording density of the optical disc, the wavelength of the laser beam has to be shortened and the NA of the objective lens has to be increased. On the contrary, because the coma aberration created due to the tilt of the optical disc is increased in proportion to the third power of the NA, the tilt margin of the optical disc due to high NA is very small and the laser beam becomes dim due to a little tilt, so that it cannot achieve a high recording density. To increase the recording density, as disclosed by the Japanese Laid Open H11-31337, the cover layer, which is the transmission layer of the laser beam, is very thin (for example, about 0.1 mm), but it has to suppress the coma aberration due to the tilt of the optical disc increasing as the NA increases.

In the manufacturing process for the above optical disc, for example, a liquid ultraviolet curing adhesive is supplied to a resin disc substrate loaded onto a turntable of a spin coater. A sheet, which is a thin and transparent film, is deposed on the disc substrate via the ultraviolet curing adhesive to form a multi-layered disc. The multi-layered disc is then rotated at a high speed by the turntable so that the adhesive between the disc substrate and the sheet extends and becomes a thin film. Afterwards, the multi-layered disc is transported from the turntable to an ultraviolet ray irradiation apparatus. In the ultraviolet ray irradiation apparatus, the ultraviolet rays irradiate the multi-layered disc so that the ultraviolet curing adhesive filled between the disc substrate and the sheet becomes hard. In this way, the sheet is adhered to the disc substrate by the ultraviolet curing adhesive to form a cover layer.

When forming the cover layer by the sheet and the adhesive, it is very difficult to adhere the sheet, at least to within about 0.1 mm of the inner circumference of the sheet, to the disc substrate without damaging the quality of the optical disc, especially the appearance quality. However, the ultraviolet curing adhesive between the disc substrate and the sheet can be comparatively and simply uniformed in thickness due to its extension to the outer circumference by the centrifugal force. Furthermore, the surplus adhesive among the ultraviolet curing adhesive extended to the outer circumference can be prevented from being adhered on the surface of the optical disc because the surplus adhesive is shaken off at the outer circumference by the centrifugal force.

In addition, the conventional transporting apparatus for the multi-layered disc, for example, comprises a transporting arm to move the multi-layered disc body in the up-and-down direction and the horizontal direction, and a sucking unit arranged in the front end of the transporting arm. The transporting apparatus, by the sucking unit, sucks the upper surface of the multi-layered disc, i.e., the surface of the sheet, and then makes the transporting arm raise, lower, and rotate so that the multi-layered disc is raised from the turntable of the spin coater and then transported to the ultraviolet ray irradiation apparatus.

However, in order to adhere at least the inner circumference of the sheet to the disc substrate, the ultraviolet curing adhesive is applied to a ring region corresponding to the inner circumference of the sheet on the disc substrate before adhering the sheet. Otherwise, the ultraviolet curing adhesive has to be pushed onto the disc substrate by loading of the sheet on the disc substrate, to spread at least over the inner circumference of the sheet. At this time, even if only a little of the ultraviolet curing adhesive is surplus, ultraviolet curing adhesive is overflowed from between the sheet and the disc substrate to the inner circumference of the sheet. The ultraviolet curing adhesive overflowed from between the sheet and the disc substrate will be spun to the surface of the optical disc during the high speed rotation of the turn table, and this causes radiative blots when curing by the ultraviolet ray irradiation, resulting in the degradation of the appearance quality. In addition, as the optical disc with its sheet whose inner circumference is not well adhered to the disc substrate is repeatedly loaded to an optical drive, the sheet might be exfoliated from the vicinity of the inner circumference because the sheet is very thin and low in strength. Additionally, the appearance is worse to the eyes.

In addition, when the multi-layered disc is moved from the turntable to the ultraviolet ray irradiation apparatus by the aforementioned transporting apparatus, as the surface of the sheet is chucked by the chucking unit to raise the multi-layered disc using the transporting arm, an attraction force to the sheet created by a negative pressure in the chucking unit, or a load etc created by the weight of the multi-layered disc itself begins to act. At this time, because the sheet on the disc substrate is very thin, for example below 0.1 mm, wrinkles or local exfoliations might occur in the vicinity of the chucked portions due to the chucking unit. Similar to this is if the sheet is incompletely adhered to the disc substrate, and these wrinkles and exfoliations create degradation of the appearance quality. Furthermore, as the exfoliations occur on the sheet, the air will enter between the disc substrate and the sheet, causing that the adhesion between the disc substrate and the sheet to be incomplete.

The exfoliations on the sheet expand from locations where the air enters when the optical disc is in use, and additionally the transmission rate of the laser beam can vary, causing errors of recording and reproducing.

SUMMARY OF THE INVENTION

According to the foregoing description, it is an object of the invention to provide a method for manufacturing an optical disc, wherein the inner circumference to the outer circumference of the sheet can be simply adhered onto a disc substrate by an adhesive, and additionally it can prevent the surplus adhesive during the adhesion from being adhered to the disc surface to damage the disc quality.

It is another object of the invention to provide a method for transporting a multi-layered disc, capable of raising and transporting the multi-layered disc before the adhesive between the sheet and the disc substrate is cured without creating any wrinkle or exfoliation on the sheet.

To achieve at least the above objects, the invention provides a method for manufacturing an optical disc. After forming a ring groove at an inner side of an information recording region in the information recording layer formed on the disc substrate, an adhering process is performed for adhering the sheet to the disc substrate where the ring groove has been formed.

In the adhering process above, the adhesive is supplied to an outer side of the ring groove on the disc substrate, the sheet is loaded onto a region from the outer side of the information recording region to the inner side of the ring groove, and the adhesive between the sheet and the disc substrate is extended from the ring groove to the outer side of the sheet in a radial direction. When extending the adhesive, even though the amount of the adhesive is larger than that required for adhering the inner side of the sheet to the disc substrate and moves to the inner side, because the surplus adhesive will flow into the groove and then be blocked, the surplus adhesive will not overflow toward the inner side of the groove.

To extend the adhesive between the disc substrate and the sheet from the groove to the outer side of the sheet in the radial direction, for example, after the adhesive is pressed by the sheet inwards to spread to the groove, the adhesive can be extended outwards by spin-coating to the outer circumference of the sheet. In addition, after providing a negative pressure to form the gap between the sheet and the disc substrate to attract the adhesive into the groove, the adhesive can be extended outwards by spin-coating to the outer circumference of the sheet.

Furthermore, in the above adhering process, after the adhesive between the sheet and the disc substrate is extended to the outer side and cured, a non-adhered portion of the sheet that extends towards the inner side of the ring groove is cut to remove the non-adhered portion from the disc substrate. In such a way, the whole sheet from the inner circumference to the outer circumference can be adhered to the disc substrate by the adhesive.

In addition, when the disc substrate is formed by molding using a mold that is made of a resin material, the groove formed on the disc substrate can be formed, for example, by having a ring protrusion corresponding to the groove shape formed on a stamper that is a portion of the mold, or on a retainer that supports the stamper, and then as the disc substrate is formed by molding, the ring groove can be formed by the protrusion. Alternatively, the groove can be formed on the disc substrate by cutting after being formed by molding.

Furthermore, the thickness of the sheet can be between 30 $\mu$m~150 $\mu$m. Namely, the coma aberration due to the tilt of the optical disc being increased in proportion to the third power of the numerical aperture NA of the objective lens, and the margin for the tilt of the optical disc due to the high NA value is very small. Therefore, when NA is increased for high recording density, the cover layer, the light transmission layer, of the optical disc has to be thinned in order to obtain a sufficient tilt margin. However, as the cover layer is thinned, the thickness of the sheet has to be also thinned and the thinned sheet will cause a reduction of its strength (rigidity). As a result, the entire sheet from the inner circumference to the outer circumference cannot be adhered on the disc substrate, and therefore, the sheet might be exfoliated from the disc substrate. Accordingly, when the thickness of the sheet is between 30 $\mu$m~150 $\mu$m, to prevent the sheet from exfoliating from the disc substrate, the above method is suitably used, and therefore, the entire sheet from the inner circumference to the outer circumference can be firmly adhered onto the disc substrate.

In addition, the invention provides a method for transporting a multi-layered disc. In order to lift up the multi-layered disc, that has the sheet loaded onto the disc substrate through the adhesive before the adhesive between the disc substrate and the sheet is cured, to transport by a transporting apparatus for transporting the multi-layered disc, the transporting apparatus is connected to the disc substrate of the multi-layered disc, a loading weight of the multi-layered disc is supported by the transporting apparatus through the disc substrate, and the multi-layered disc is lifted up and transported by the transporting apparatus. Accordingly, when transporting the multi-layered disc, because the loading weight from the transporting apparatus does not directly act on the sheet, it can prevent the sheet of the multi-layered disc from wrinkling due to the force of the transporting apparatus and prevent the sheet from exfoliating off the disc substrate.

The loading weight from the multi-layered disc to the transporting apparatus is the loading weight created by the weight of the multi-layered disc itself or the inertial force etc. A transporting force as a reaction of the above loading weight when transporting the multi-layered disc, such as a holding force for maintaining the multi-layered disc to connect to the transporting apparatus, acts on the multi-layered disc from the transporting apparatus.

Furthermore, if the above force such as the transporting force and the holding force etc does not directly act on the sheet of the multi-layered disc from the transporting apparatus, the multi-layered disc can be connected to the transporting apparatus by any method. For example, the outer circumference or the inner circumference of the disc substrate can be fixed by plural fixers installed in the transporting apparatus, and the transporting apparatus is directly connected to the multi-layered disc. Alternatively, the transporting apparatus can be connected to the turntable that loads the multi-layered disc to indirectly connect to the disc substrate.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Followings are descriptions of the method for manufacturing an optical disc and the method for transporting a multi-layered disc according to embodiments of the invention with references to the drawings.

Method for Manufacturing Optical Disc

Figure 1A:
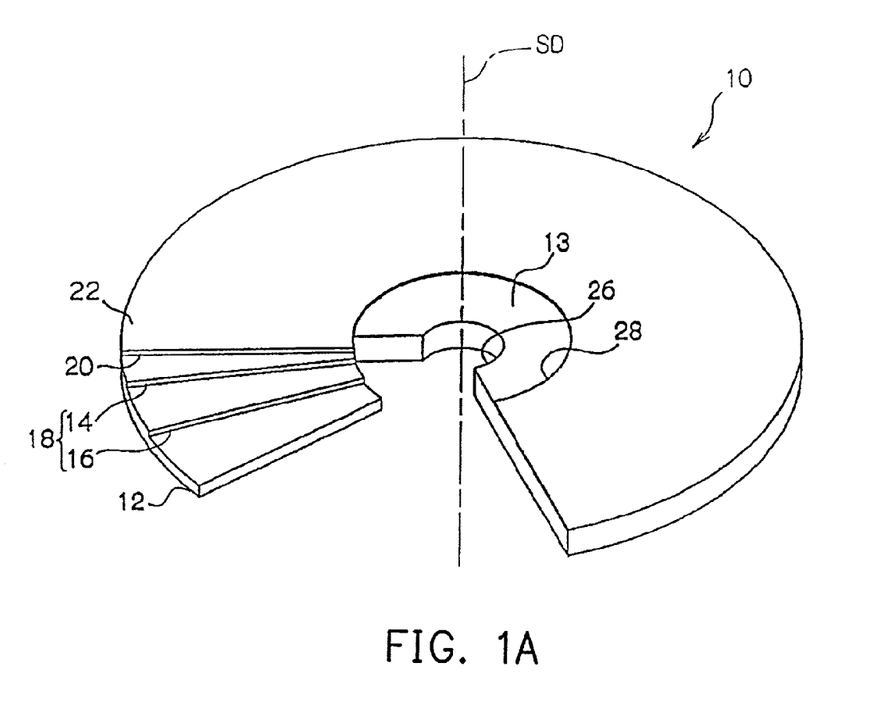
FIGS. 1A and 1B are a perspective view and a cross-sectional view respectively for showing the structure of an optical disc according to the first embodiment of the invention.
Figure 1B:
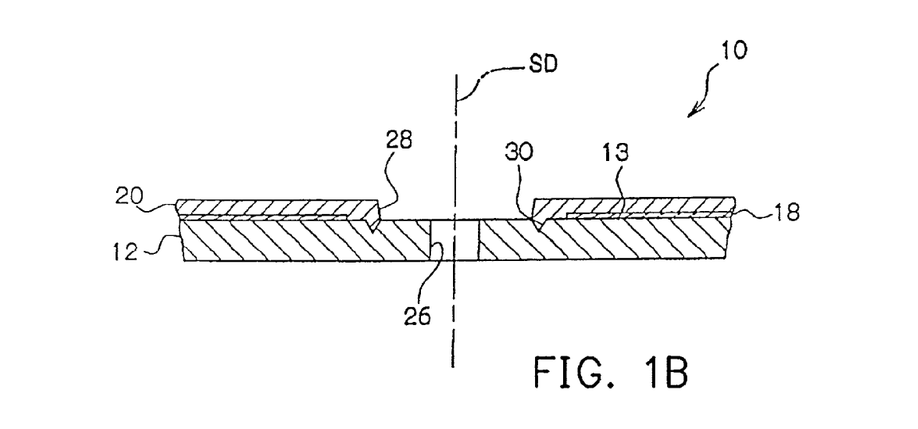

First, the first embodiment of the invention relates to the method for manufacturing an optical disc. FIG. 1 shows an optical disc according to the first embodiment of the invention. Additionally, the optical disc 10 can record information with a high density like a conventional optical disc, such as a DVD-R. For example, in comparison to the conventional optical disc, the laser beam for recording and reproducing uses a bluish purple laser beam with a short wavelength, and the numerical aperture NA to the objective lens of the recording/reproducing device increases up to about 0.85. The recording capacity of a single-side disc for a 12 cm optical disc 10 is increased up to about 22.5 GB (giga bytes).

As shown in FIG. 1A, the optical disc 10 comprises a disc substrate 12 formed in a circular disc shape, a recording layer 18 layered on the disc substrate 12, and a transparent cover layer 20 covering the recording layer 12. The recording layer 18 is layered by a light reflection layer 16 and a light absorption layer 14. The cover layer 20 is composed of a sheet 22 (described later) that is adhered to the disc substrate 12 through the recording layer 18 by an ultraviolet curing adhesive 24.

As shown in FIG. 1B, in the central portion of the disc substrate 12, a circular center hole 26 is formed by penetrating the disc substrate 12 along a rotational center of the optical disc 10, the axial center SD. A circular opening 28 with a diameter larger than the center hole 26 is also formed on the center portion of the cover layer centered on the axial center SD. In addition, on the recording surface 13 of the disc substrate 12 at the side of the cover layer 20, a ring groove 30 is formed on the inner circumference of the recording layer 18 along the circumferential direction centered on the axial center SD.

The disc substrate is formed by molding, using resin material such as the polycarbonate (PC). For example, the mold (not shown) for molding to form the disc substrate 12 comprises a main body having a circular concave cavity corresponding to the shape of the disc substrate 12 thereon, and a stamper with a circular-plate shape for transcribing to form a guiding groove on the recording surface 13 on the disc substrate 12. The stamper has a structure supported by a retainer of the mold formation apparatus. A protrusion with a ring shape corresponding to the groove 30 is formed on the stamper or the retainer. When the guiding groove is transcribed on the disc substrate 12 by the stamper, the groove 30 on the disc substrate 12 is formed by the ring protrusion at the same time as the formation of the guiding groove.

On the other hand, the sheet 22 forming the cover layer 20 is made of a thin film of transparent resin, such as polycarbonate (PC), polyethylene terephthalate (PET). Before adhering to the disc substrate 12, a position determining hole 32 with a circular shape having the same diameter as the central hole 26 on the disc substrate 12 is formed by penetrating through the central portion of the sheet 22, referring to FIG. 3. The thickness of the thin film as the material of the sheet 22 is selected from a range of 30 μm~150 μm.

FIG. 2 shows an adhesion process in the method for manufacturing the optical disc according to the embodiment of the invention. In the adhesion process, first, the disc substrate 12 where the recording layer 18 is formed on the recording surface 13 by well-known method is loaded onto a spin coater 34. The spin coater 34, as shown in FIG. 2, has a turntable 36, which is a thick circular plate. The upper surface of the turntable 36 is used as a loading surface 38 for loading the disc substrate 12. A cylindrical boss 40 stands on the central portion of the loading surface 38. The outer diameter of the boss 40 is a little smaller than the inner diameter of the central hole 26 on the disc substrate 12. As the disc substrate 12 is loaded on the loading surface 38, the boss 40 is inserted to the central hole 26 and the disc substrate 12 and the turntable 36 become coaxial so that the position is determined.

As shown in FIGS. 2A~2D, a rotational shaft 42 under the central portion of the turntable 36 is coaxially connected to the turntable 36, and the rotational shaft 42 is directly connected to a driving motor (not shown), or through a torque transmission mechanism. In addition, as shown in FIG. 3, a ring attraction groove 44 is formed on the inner circumference of the loading surface of the turntable 36 along the circumferential direction centered on the axial center ST of the turntable 36. In addition, a concave running groove 46 is formed outside the attraction groove 44 along the circumferential direction and has a width wider than that of the attraction groove 44. The attraction groove 44 is connected to a vacuum generating device (not shown), such as a vacuum pump, through a connection path with a pipe shape installed in the turntable 36. The vacuum generating device provides a negative pressure in the attraction groove 44 when the turntable 36 rotates, so that the disc substrate 12 can be sucked and fixed on the loading surface 38. In addition, except for the inner and outer circumferences under the disc substrate 12, the running groove 46 on the loading surface 38 makes the region corresponding to the recording layer 18 to not be in contact with the loading surface 38, so that it prevents this region from being damaged, and prevents foreign articles, such as dust, from being adhered on this region.

Figure 2A:
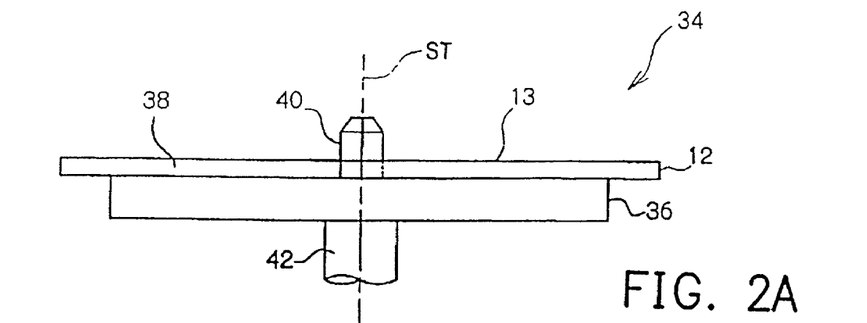
FIGS. 2A~2D show an adhesion process in the method for manufacturing the optical disc according to the embodiment of the invention.
Figure 2B:
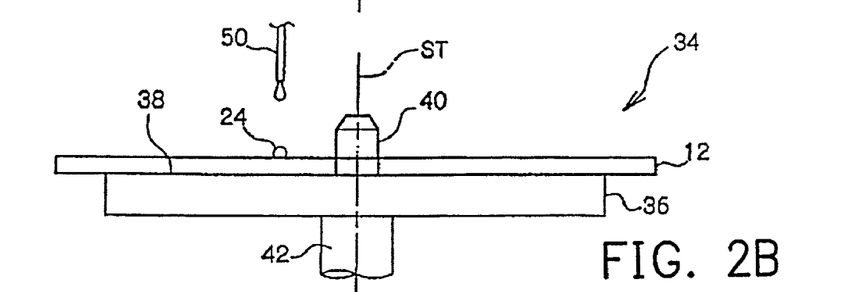
Figure 3:
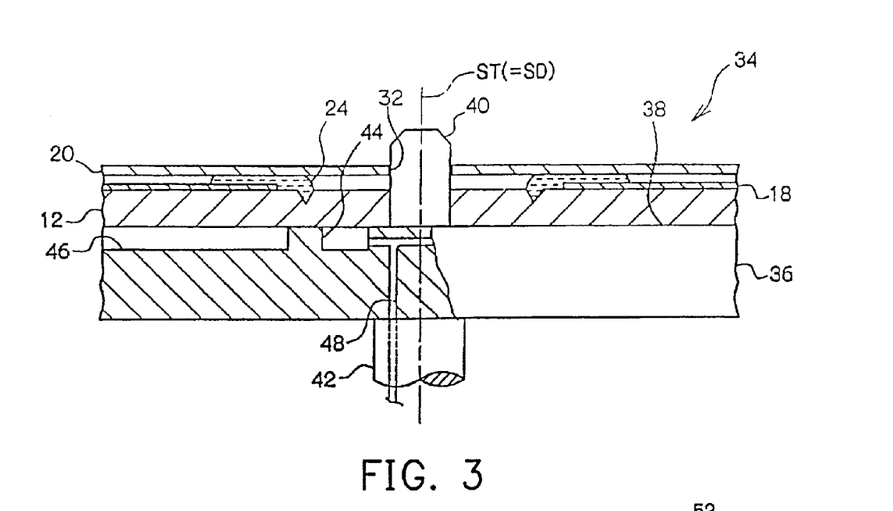
FIG. 3 is a cross-sectional view showing a structure of the turntable and the optical disc according to the embodiment of the invention, and shows a status immediately after the sheet is loaded onto the disc substrate through the ultraviolet curing adhesive.

In the adhesion process for the optical disc, as the disc substrate 12 is loaded onto the loading surface 38 of the turntable shown in FIG. 2A, the ultraviolet curing adhesive 24 is supplied to the recording surface 13 on the disc substrate 12 by a nuzzle dispenser 50 that is an adhesive supplier, as shown in FIG. 2B. When supplying the ultraviolet curing adhesive 24 from the dispenser 50, the position of the dispenser 50 is adjusted to locate at an outer side from the groove 30 by a preset distance along the radial direction. Then, the turntable rotates at a low speed and the ultraviolet curing adhesive 24 is dropped from the dispenser 50. Alternatively, the dispenser 50 can move along the circumferential direction and the ultraviolet curing adhesive 24 is dropped from the dispenser 50. In this way, the ultraviolet curing adhesive 24 dropped from the dispenser 50 becomes a ring shape at the outer side from the groove 30 by a preset distance, and is adhered on the recording surface 13.

Figure 2C:
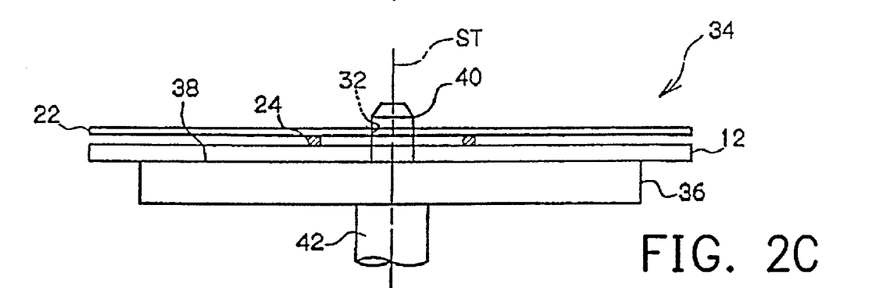

Next, the sheet 22 is slowly lowered to the disc substrate 12, and as shown in FIG. 2C, the boss 40 is inserted into the position determining hole 32 of the sheet 22. Therefore, the position is determined so that the sheet 22 and the turntable 36 are coaxial, i.e., the sheet 22 and the disc substrate 12 are concentric in the surface direction. Accordingly, the sheet 22 is loaded onto the disc substrate 12 via the ultraviolet curing adhesive 24. Due to the sheet 22, the ultraviolet curing adhesive 24 is pressed to spread to the inner side and outer sides respectively in the radial direction. At this time, the ultraviolet curing adhesive 24, which is pressed to spread by the sheet 22 towards the inner side, reaches at least the groove 30 on the disc substrate 12. In other words, the distance from the position where the ultraviolet curing adhesive is dropped on the disc substrate 12 to the groove 30 is smaller than the displacement of the ultraviolet curing adhesive 24 toward the inner side when pressed to spread by the sheet 22.

However, the ultraviolet curing adhesive 24 is pressed by the sheet 22 to spread to the groove 30 so that the attraction opening (not shown) connected to the connection path 48 of the turntable 36 on the outer surface of the boss 40 is opened, and a negative pressure from the gap between the disc substrate 12 and the sheet 22 is supplied within a preset time. By the negative pressure, the ultraviolet curing adhesive 24 between the sheet 22 and the disc substrate 12 can be compulsorily attracted to the groove 30.

Figure 2D:
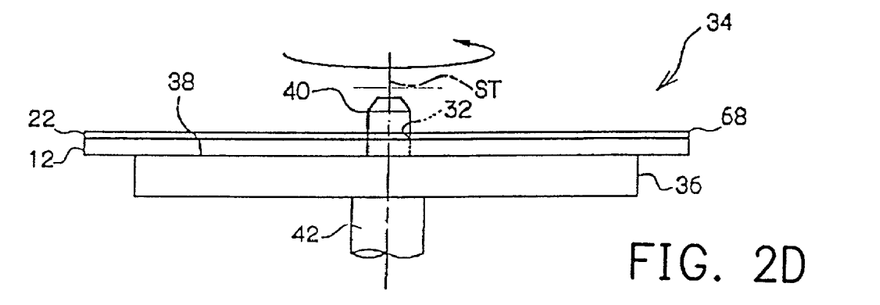

As shown in FIG. 2C, as the sheet 22 is loaded on the disc substrate 12, the turntable 36 begins to rotate at a high speed. Thereby, as shown in FIG. 2D, the disc substrate 12 and the sheet 22 are rotated together with the turntable 36. The ultraviolet curing adhesive 24 between the sheet 22 and the disc substrate 12 extends outwards by the centrifugal force, so that the ultraviolet curing adhesive 24 is thinned and therefore the thickness from the groove 30 to the outer circumference of the sheet 22 becomes substantially uniform. At this time, the surplus ultraviolet curing adhesive 24 between the disc substrate 12 and the sheet 22 is scattered outwards from the outer rim between the disc substrate 12 and the sheet 22, and then adhered on the peripheral of the turntable 36. Before the ultraviolet curing adhesive 24 is cured, the ultraviolet curing adhesive 24 has a sufficient fluidity and can be easily removed and recycled.

Figure 4:
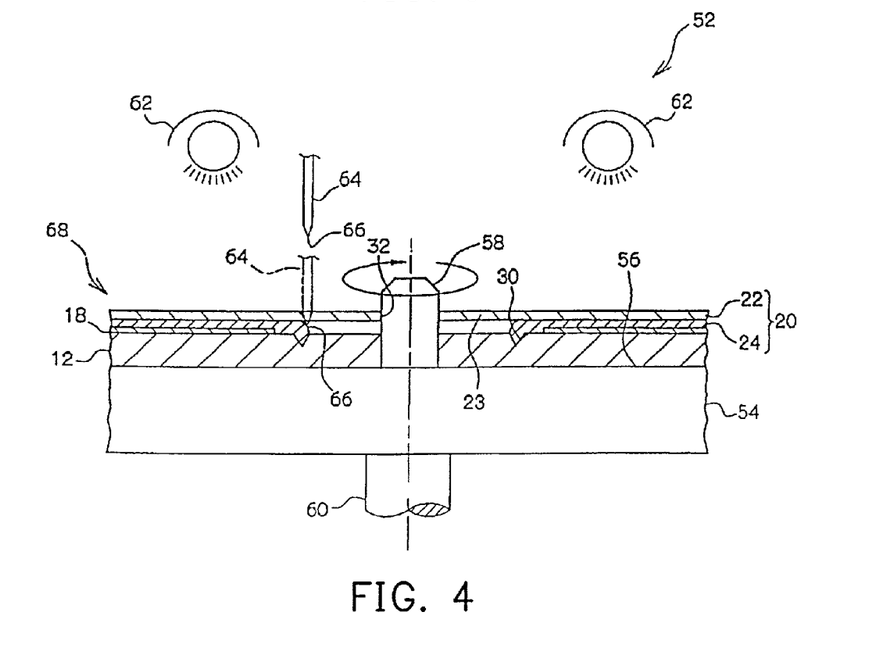
FIG. 4 is a cross-sectional view showing a structure of the ultraviolet ray irradiation apparatus and the optical disc according to the embodiment of the invention, and shows a status when ultraviolet rays irradiate the ultraviolet curing adhesive.

Referring to FIG. 4, a multi-layered disc 68 layered by the disc substrate 12 and the sheet 22 through the ultraviolet curing adhesive 24 before being cured is transferred to a turntable 54 of an ultraviolet ray irradiation apparatus 52 by a disc transporting apparatus (not shown). At this time, the disc transporting apparatus supports the multi-layered disc 68 from the underside, i.e., the disc substrate 12, and transfers the multi-layered disc 68 from the turntable 36 to the turntable 54 of the ultraviolet ray irradiation apparatus 52. Thereby, the multi-layered disc 68 can be transported in such a way that no wrinkles are created on the sheet 22 as well as the sheet 22 being not shifted on the disc substrate 12. Furthermore, the turntable 36 of the spin coater 34 is detachable, and after finishing the spin coating, the multi-layered disc 68 can be transported to the ultraviolet ray irradiation apparatus 52 together with the turntable 36 loading the disc 68.

As shown in FIG. 4, the turntable 54 is installed in the ultraviolet ray irradiation apparatus 52. A cylindrical boss 58 is also stood at the central portion of a loading surface of the turntable 54. The boss 58 determines a position so that the multi-layered disc 68 loaded on the loading surface 56 is coaxial with the turntable 54. In addition, a rotational shaft 60 is connected to the central portion of the underside of the turntable 54. The turntable 54 is rotatably supported by the rotational shaft 60 and connected to a driving motor (not shown). As the multi-layered disc is loaded on the turntable 54, the turntable 54 is rotated at a low speed by the torque generated from the multi-layered disc 68 and the driving motor.

As shown in FIG. 4, ultraviolet lamps 62 each constituted of a light source and a reflector etc are arranged above the turntable 54 in the ultraviolet ray irradiation apparatus 52. As the turntable 54 begins to rotate, the ultraviolet lamps 62 irradiate ultraviolet rays with a predetermined wavelength to the multi-layered disc 68. Most of the ultraviolet rays penetrate through the sheet 22 to the ultraviolet curing adhesive 24. Accordingly, a curing reaction of the ultraviolet curing adhesive 24 begins. As a predetermining curing time lapses, the thinned ultraviolet curing adhesive 24 between the sheet 22 and the disc substrate 12 is completely cured (hardened). As a result, the sheet 22 is adhered to the disc substrate 12, and at the same time, the cover layer 20 composed of the sheet 22 and the cured ultraviolet curing adhesive 24 is thus formed with a thickness below 150 $\mu$m.

After the ultraviolet curing adhesive 24 is cured, the ultraviolet lamps 62 are turned off and recede to the outer rim of the turntable 54. As shown in FIG. 4, a cutting blade 64 is arranged above the turntable 54 in the ultraviolet ray irradiation apparatus 52. The cutting blade 64 is further connected to an operation shaft of a linear actuator (not shown) used as a driving source for a step motor etc. By the linear actuator, the cutting blade 64 is supported to be able to contact with the turntable 54. In addition, the cutting blade 64 is supported to a position corresponding to the groove 30 on the disc substrate 12 in the radial direction. For example, the cutting blade 64 is supported so that the blade edge 66 is located at an inner side where it is slightly in from the inner circumference of the groove 30. However, it has to fine-tune the position in the radial direction of the blade edge 66 according to the shape of the blade edge 66 and the thickness of the sheet 22 etc.

Figure 5:
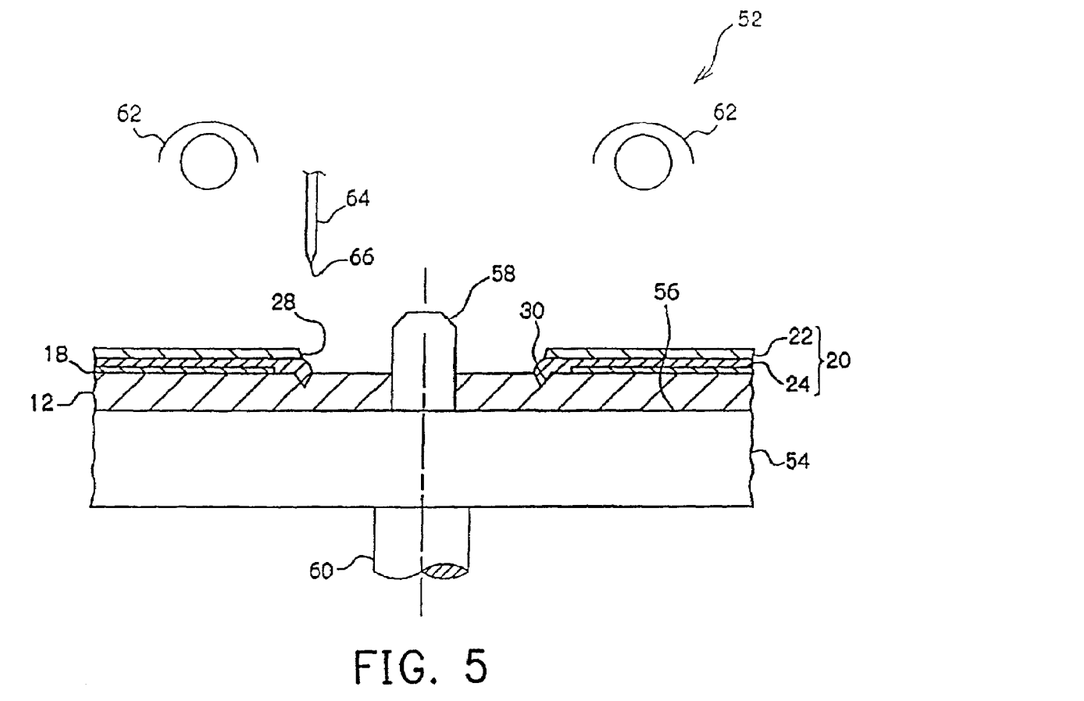
FIG. 5 is a cross-sectional view showing a structure of the ultraviolet ray irradiation apparatus and the optical disc according to the embodiment of the invention, and shows a status where the non-adhered portion is removed from the sheet after the ultraviolet curing adhesive is cured.

The cutting blade 64 is in standby above the turntable 54 that is rotated at a low speed by the linear actuator before the curing for the ultraviolet curing adhesive 24 in the multi-layered disc 68 is finished. As the curing of the ultraviolet curing adhesive 24 is finished, the cutting blade 64 begins to be lowered by the linear actuator toward the turntable 54 loading the multi-layered disc 68 thereon. At this time, as shown in the dash line in FIG. 4, the linear actuator lowers the cutting blade 64 so that the blade edge 66 penetrates the sheet 22 in the thickness direction, but the blade edge 66 reaches a cutting position not reaching the recording surface 13 of the disc substrate 12. The cutting blade 64 keeps at the cutting position for an interval of at least one revolution of the turntable 54. Afterwards, the cutting blade is raised by the linear actuator and put in standby above the turntable 54. In addition, the turntable 54 stops rotating as the cutting blade 64 begins to rise. Thereby, the non-adhered portion 23 of the sheet 22 that is located at a more inner side than the groove 30 is cut from the sheet 22 and the remaining inner circumference of the sheet 22 is adhered to the disc substrate 12. For example, the non-adhered portion 23 is sucked by a negative pressure attraction unit of a sucker installed at the front end of a manipulator, and the non-adhered portion 23 is removed from the disc substrate 12 by the manipulator. Accordingly, as shown in FIG. 5, the opening 28 is formed on the sheet 22.

In the embodiment, the non-adhered portion 23 of the sheet 22 is cut and removed in the ultraviolet ray irradiation apparatus 52. However, the multi-layered disc 68 that the ultraviolet curing adhesive 24 has been completely cured can be transported from the ultraviolet ray irradiation apparatus 52 to a cutting apparatus, at which the non-adhered portion 23 is cut and removed from the sheet 22. At this time, similar to that in the ultraviolet ray irradiation apparatus 52, the multi-layered disc 68 is loaded on a turntable to rotate, and then the sheet 22 can be cut by a cutting blade. In contrast, the multi-layered disc 68 can be fixed and the cutting blade moves in the radial direction to cut the sheet 22. Alternatively, a cutting blade with a circular blade edge is pressed to the sheet 22, and the sheet 22 is pressed to be cut by the blade edge of the cutting blade so that the non-adhered portion 23 is cut away from the inner circumference. In addition, the sheet 22 can be cut by the heated cutting blade 64, and at the same time, the cut profile of the sheet 22 is melted and softened to work out a desired shape. Furthermore, without using the cutting tools such as the cutting blade 64, a laser beam can be used for melting to cut the non-adhered portion 23 away from the sheet 22. In addition, notch grooves or intermittent cutting parts with dash lines etc are previously formed along the groove 30, and after the ultraviolet curing adhesive 24 is cured, the non-adhered portion 23 can be separated from the sheet only by the pressurization without using the cutting blade.

The multi-layered disc 68 where the non-adhered portion 23 has been removed from the sheet 22 becomes the optical disc product 10 shown in FIG. 1. If necessary, the resin paint is applied and dried on a disc surface opposite to the cover layer 20 of the disc substrate 12, and then type of the optical disc, label etc are printed thereon. Afterwards, the shape and size are examined to obtain the optical disc as a commercial product.

As described above, according to the method for manufacturing the optical disc, the ultraviolet curing adhesive 24 is supplied to the outer side of the groove 30 on the disc substrate 12, and the sheet 22 is loaded on the disc substrate 12 through the ultraviolet curing adhesive 24. The ultraviolet curing adhesive 24 between the sheet 22 and the disc substrate 12 is pressed by the sheet 22 to extend to the groove 30. However, when extending, even if the ultraviolet curing adhesive 24 has an amount larger than the required amount for adhering the inner side of the sheet 22 to the disc substrate 12, because the surplus ultraviolet curing adhesive 24 is blocked when flowing into the groove 30, the surplus ultraviolet curing adhesive 24 does not overflow easily toward the inner side of the groove 30. In addition, even though the ultraviolet curing adhesive 24 overflows toward the inner side of the groove 30, the ultraviolet curing adhesive 24 is kept between the non-adhered portion 23 of the sheet 22 and the disc substrate 12. Therefore, before the ultraviolet curing adhesive 24 is cured, when the ultraviolet curing adhesive 24 between the disc substrate 12 and the sheet 22 is extended toward the outer side by the spin coater, the non-adhered portion 23 can stop the ultraviolet curing adhesive 24 that overflows toward the inner side of the groove 30 from moving toward the surface of the multi-layered disc.

In the method for manufacturing the optical disc of the embodiment, the ultraviolet curing adhesive 24 between the disc substrate 12 and the sheet 22 is extended toward the outer side by the spin coater. After the ultraviolet curing adhesive 24 filled between the disc substrate 12 and the sheet 22 is cured by the irradiation of the ultraviolet rays, the non-adhered portion 23 of the sheet 22 extending to the outer side of the groove 30 is cut along the groove 30. By removing the non-adhered portion 23 from the disc substrate 12, the whole sheet 22 from the inner circumference to the outer circumference can be adhered onto the disc substrate 12 by the ultraviolet curing adhesive 24.

As a result, in order to increase the NA corresponding to the high recording density, even though the sheet 22 is very thin and the strength (rigidity) of the sheet is reduced, because the whole sheet 22 from the inner circumference to the outer circumference can be adhered onto the disc substrate 12 by the ultraviolet curing adhesive 24, it can actually prevent the sheet 22 of the optical disc 10 from exfoliating off the disc substrate 12. In addition, on the surface of the optical disc, except for the ultraviolet curing adhesive 24 that is cured along the groove 30, the other ultraviolet curing adhesive 24 is not exposed to the disc surface, so that the appearance quality of the optical disc is very excellent.

Method for Transporting Multi-Layered Disc

Next, a method for transporting the multi-layered disc according to the second embodiment of the invention is described. The method for transporting the multi-layered disc of the second embodiment is suitable for a manufacturing process for an optical disc where a thin sheet is loaded on a disc substrate through an adhesive and a cover layer composed of the sheet and the adhesive is formed.

Figure 6:
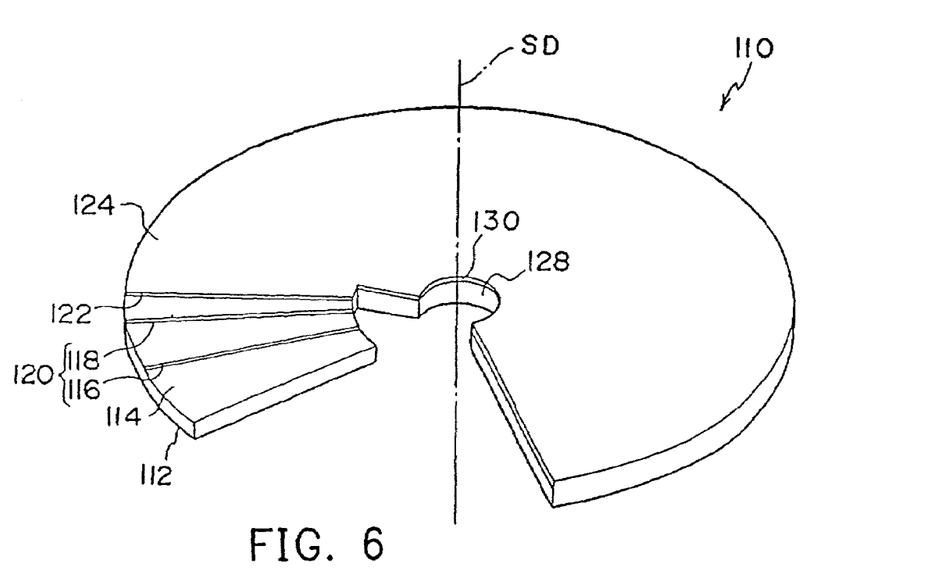
FIG. 6 a perspective view showing an optical disc according to the second embodiment of the invention.

FIG. 6 shows an optical disc according to the second embodiment of the invention. The optical disc 110 has the same structure as the optical disc 10 shown in FIG. 1. Regarding the optical disc 110, the laser beam for recording and reproducing uses a bluish purple laser beam with a short wavelength, and the numerical aperture NA to the objective lens of the recording/reproducing device increases up to about 0.85. The recording capacity of a single-side disc for a 12 cm optical disc 110 is increased up to about 22.5 GB. However, in the optical disc 10 shown in FIG. 1, the opening 28, larger than the center hole 26 of the disc substrate 12, is formed on the sheet 22 that forms the cover layer 20 together with the ultraviolet curing adhesive. In contrast, in the optical disc 110 shown in FIG. 6, a center hole 130 having the same inner diameter as the center hole 128 of the disc substrate 112 is formed on the central portion of the sheet 124.

As shown in FIG. 6, the optical disc 110 has a disc substrate 112 formed in a circular disc shape. One surface of the disc substrate 112 serves as a recording surface 114. The recording layer 114 is sequentially layered by a light reflection layer 116 and a light absorption layer 118, and a recording layer 120 is formed by the light reflection layer 116 and the light absorption layer 118. Additionally, in the optical disc 110, a transparent cover layer 122 is formed on the disc substrate 112 to cover the recording layer 120. The cover layer 122 is formed by adhering the sheet 124 to the disc substrate 112 through the recording layer 120 by an ultraviolet curing adhesive 126.

The disc substrate 112 is formed by molding, using resin material such as the polycarbonate (PC), and the sheet 124 forming the cover layer 124 is made of a thin film of transparent resin, such as polycarbonate (PC), polyethylene terephthalate (PET). The thickness of the thin film as the material of the sheet 22 is selected from a range of 30 $\mu m \sim 150 \mu m$.

Figure 7:
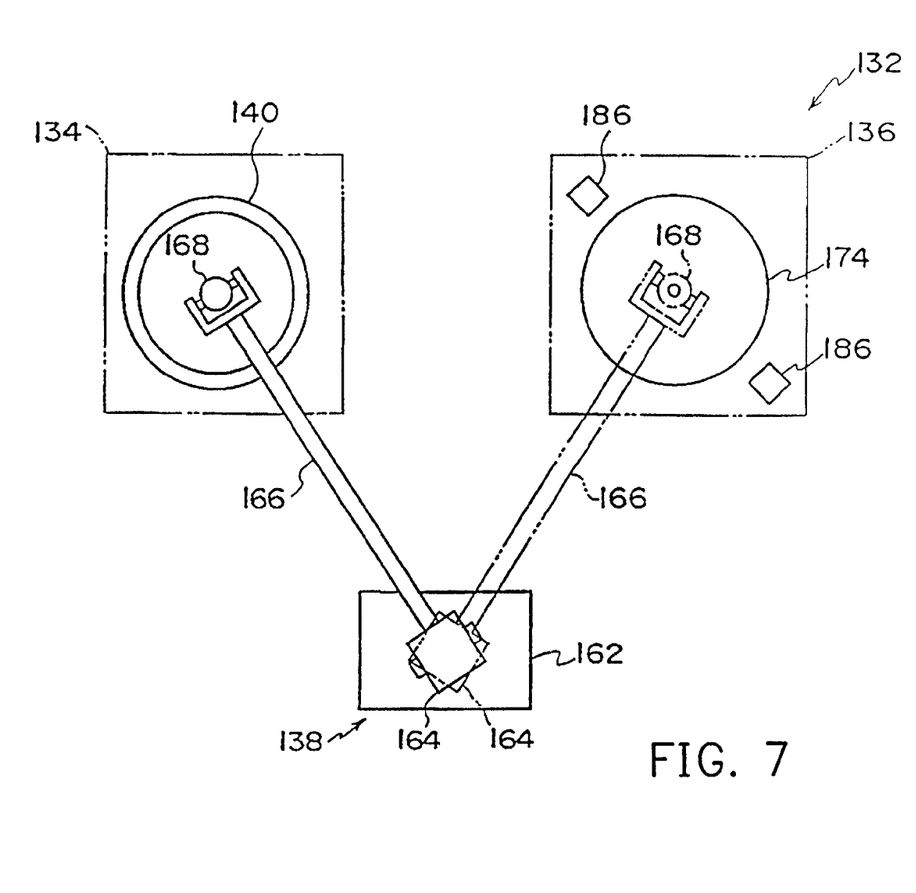
FIG. 7 shows an disc making apparatus for making an optical disc according to the second embodiment.

FIG. 7 shows a disc making apparatus for making an optical disc according to the second embodiment. The disc making apparatus comprises a spin coater 134, an ultraviolet ray irradiation apparatus 136 and a disc transporting apparatus 138. As shown in FIG. 8, a thick circular turntable 140 is installed in the spin coater 134. A surface on the turntable 140 for loading the disc substrate 112 is used as a loading surface 142. A cylindrical boss 144 is installed by standing on the central portion of the loading surface 142 along the axial center $ST_1$. The outer diameter of the boss 144 is slightly smaller than the inner diameter of the center hole 128 of the disc substrate 112. As the disc substrate 112 is loaded on to the loading surface 142, the boss 144 is inserter into the center hole 128 to determine a position where the disc substrate 112 and the turntable 140 are coaxial.

As shown in FIGS. 8A~8D, a rotational shaft 146 under the central portion of the turntable 140 is coaxially connected to the turntable 140, and the rotational shaft 146 is directly connected to a driving motor (not shown), or through a torque transmission mechanism. In addition, as shown in FIG. 9, a ring attraction groove 148 is formed on the inner side of the loading surface 142 of the turntable 140 along the circumferential direction centered on the axial center $ST_1$ of the turntable 140. In addition, a concave running groove 150 is formed outside the attraction groove 148 along the circumferential direction and has a width wider than that of the attraction groove 148. The attraction groove 148 is connected to a vacuum generating device (not shown), such as a vacuum pump, through a connection path with a pipe shape installed in the turntable 140. The vacuum generating device provides a negative pressure in the attraction groove 148 when the turntable 140 rotates, so that the disc substrate 112 can be sucked and fixed on the loading surface 142. In addition, except for the inner and outer circumferences under the disc substrate 112, the running groove 150 on the loading surface 142 makes the region corresponding to the recording layer 120 to not be in contact with the loading surface 142, so that it prevents this region from being damaged, and prevents foreign articles, such as dust, from being adhered on this region.

Figure 8A:
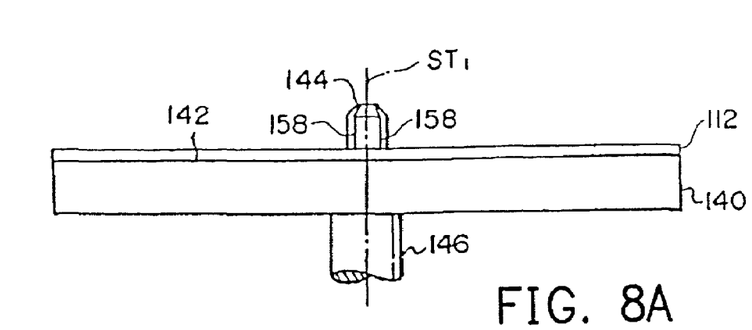
FIGS. 8A~8D are side views showing the multi-layered disc and the turntable of the spin coater, and show a process for making the multi-layered disc on the turntable.
Figure 8B:
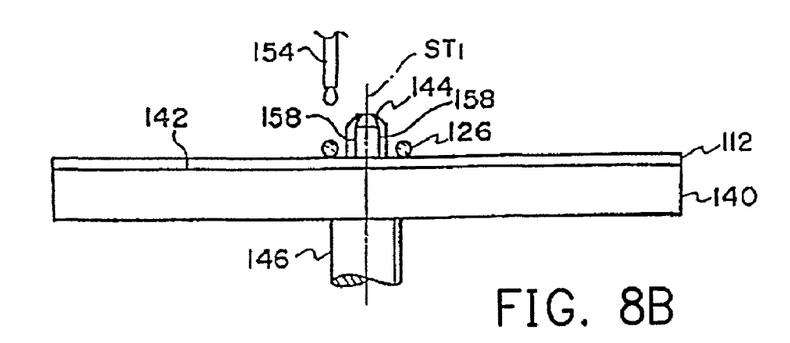
Figure 9:
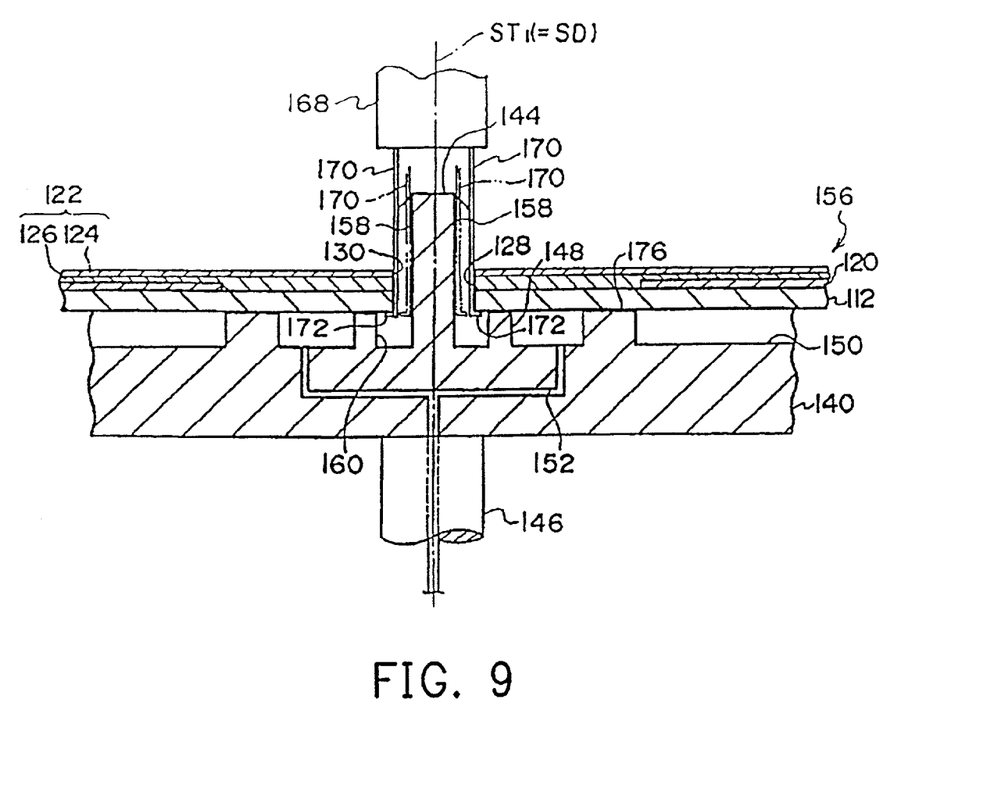
FIG. 9 is a side view showing the transporting apparatus and the turntable for the multi-layered disc according to the second embodiment of the invention.

As shown in FIG. 8A, as the disc substrate 112 is loaded on the loading surface 142 of the turntable 140, the ultraviolet curing adhesive 126 is supplied to the recording surface 114 on the disc substrate 112 by a nuzzle dispenser 154 that is an adhesive supplier, as shown in FIG. 8B. When supplying the ultraviolet curing adhesive 126 from the dispenser 154, the position of the dispenser 154 is adjusted to be located at an outer side from the center hole 128 by a preset distance. At this time, the turntable 140 rotates at a low speed and the ultraviolet curing adhesive 126 is dropped from the dispenser 154. Alternatively, the dispenser 154 can move along the circumferential direction and the ultraviolet curing adhesive 126 is dropped from the dispenser 126. In this way, the ultraviolet curing adhesive 126 dropped from the dispenser 154 becomes a ring shape at the outer side from the center hole 128 by a preset distance, and then is adhered on the recording surface 114. Alternatively, when the ultraviolet curing adhesive 126 is supplied to the recording surface 114, the dispenser 154 can move along the circumferential direction and drop the ultraviolet curing adhesive 126 without rotating the turntable 140.

Figure 8C:
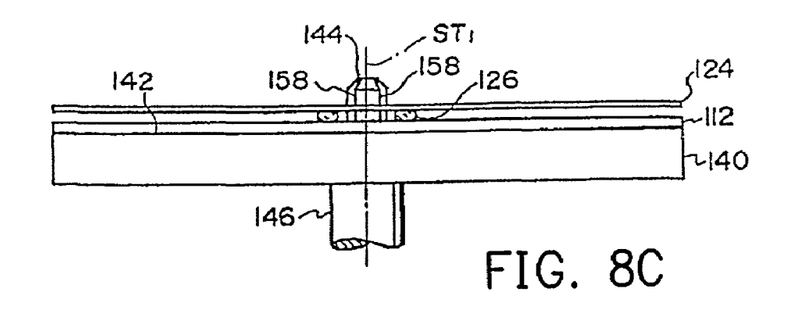

Next, the sheet 124 is slowly lowered to the disc substrate 112, and as shown in FIG. 8C, the boss 144 is inserted into the center hole 130 of the sheet 124. Therefore, the position is determined so that the sheet 124 and the turntable 140 are coaxial, and then the sheet 124 is loaded onto the disc substrate 112 via the ultraviolet curing adhesive 126. Accordingly, on the turntable 140, a multi-layered disc 156, which is composed of the disc substrate 112 having the recording layer 120 formed thereon and the sheet 124 on the disc substrate 112 through the ultraviolet curing adhesive 126, is formed. Additionally, by loading the sheet 124 onto the disc substrate 112, due to the sheet 124, the ultraviolet curing adhesive 126 is pressed to spread to the inner side and outer sides respectively. At this time, the supply amount and position of the ultraviolet curing adhesive 126 to the recording layer 114 from the dispenser 154 are set, so that ultraviolet curing adhesive 126 can be pressed to spread to a preset radial position at the inner portion of the disc substrate 112. Furthermore, the time from finishing the supply of the ultraviolet curing adhesive 126 on the recording layer 114 to loading the sheet 124 can be properly adjusted.

Figure 8D:
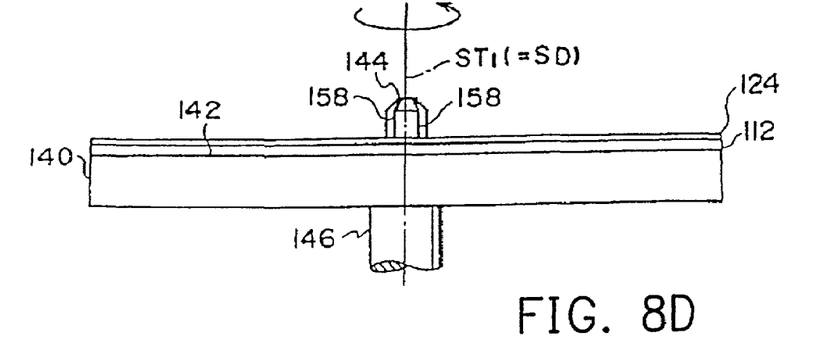

As the multi-layered disc 156 is formed, the turntable 140 of the spin coater 134 begins to rotate at a high speed. In this way, as shown in FIG. 8D, the disc substrate 112 and the sheet 124 are rotated together with the turntable 140. The ultraviolet curing adhesive 126 between the sheet 124 and the disc substrate 112 extends outwards by the centrifugal force, so that the ultraviolet curing adhesive 126 is thinned and therefore the thickness between the disc substrate 112 and sheet 124 becomes substantially uniform. At this time, the surplus ultraviolet curing adhesive 126 between the disc substrate 112 and the sheet 124 is scattered outwards from the outer rim between the disc substrate 112 and the sheet 124, and then adhered onto the periphery of the turntable 140. Before the ultraviolet curing adhesive 126 is cured, the ultraviolet curing adhesive 126 has a sufficient fluidity and can be easily removed and recycled.

As shown in FIG. 9, three insertion holes 158 are formed on the outer surface of the boss 144 of the turntable 140 in the axial direction of the boss 144. The three insertion holes 158 extend from the top to the bottom of the boss 144, and are arranged at equal intervals (120°) along the circumferential direction centered on the axis $ST_1$. A ring recess 160 is formed around the bottom of the boss 144 at the inner side of the attraction groove 148. The inner radius of the recess 160 is equal to a distance from the central axial $ST_1$ to the bottom of the insertion hole 158, but can be a little smaller than that distance. In addition, the outer radius of the recess 160 is larger than the radius of the center hole 128 of the disc substrate 112 by a preset length. The bottoms of the three insertion holes 158 are respectively coupled to the recess 160.

On the other hand, as shown in FIG. 7, a supporting stage 162 is installed on a common floor (not shown) of the spin coater 134 and the ultraviolet ray irradiation apparatus in the disc transporting apparatus 138. A rotational stage 164 capable of rotating, rising and lowering is installed on the supporting stage 162, and a driving unit (not shown) is also installed internally for driving the rotational stage 164 to rotate, rise and lower. The rotational stage 164 is connected to a base of a transporting arm 166, which is supported by the rotational stage 164 in a cantilever manner, and extends substantially in the horizontal direction. In addition, a disc connecting unit 168 (substantially, a cylinder) is connected to the tip of the transporting arm 166.

As shown in FIG. 9, three fixers 170 protrude from the bottom of the disc connecting unit 168. The three fixers 170 are slender rods and are respectively supported by the disc connecting unit 168 in a way such that the longitudinal direction of the fixer 170 and the axis $ST_1$ of the turntable 140 are in parallel. Corresponding to the three insertion holes formed on the boss 144, the three fixers 170 are arranged at equal intervals of 120° along the circumferential direction. A claw 172 that is almost bent perpendicularly to the outer side is formed at the tip of each fixer 170. The three fixers 170 are supported by the disc connecting unit 168 and are movable along the radial direction centered on the central axis of the disc connecting unit 168. In FIG. 9, the three fixers 170 can be moved between a fixing position shown in solid line and a standby position shown in dash line by an actuator such as an electromagnetic solenoid installed in the disc connecting unit 168.

As shown in FIGS. 7 and 8D, after the spin coating to the multi-layered disc 156 formed on the turntable 140 is finished, the disc transporting apparatus 138 transports the multi-layered disc 156 from the turntable 140 of the spin coater 134 to the ultraviolet ray irradiation apparatus 136. Referring to FIG. 7, when the disc transporting apparatus 138 transports the multi-layered disc 156, the position of the rotational stage 164 is first adjusted in the rotational direction and in the up-and-down direction, so that the center of the disc connecting unit 168 and the axis $ST_1$ of the turntable 140 is consistent, and the lower ends of the fixers 170 are kept above the multi-layered disc 156 on the turntable 140. Next, the transporting arm 166 and the disc connecting unit 168 together with the rotational stage 164 are lowered, so that the three fixers 170 at the standby position shown in dashed line are respectively inserted into the three insertion holes 185 in the boss 144. The rotational stage 164 is lowered to a position where the claws 172 of the fixers 170 protrude from the underside of the disc substrate 112 through the center holes 128, 130. At this time, because the tips of the fixers 170 are inserted to the recess 160 of the turntable 140, the fixers 170 protrude from the underside of the disc substrate 112 without being in contact with the turntable 140.

Referring to FIG. 9, as the claws 172 of the fixers 170 protrude from the underside of the disc substrate 112 through the center holes 128, 130, the disc transporting apparatus 138 moves the fixers 170 from the standby position shown in solid line to the fixing position shown in dashed line by the disc connecting unit 168. In such a way, the underside of the disc substrate 112 is fixed by the claws 172 of the three fixers 170 respectively. Under this status, the rotational stage 164 is raised, and the multi-layered disc 156 whose disc substrate 112 is fixed by the fixers 170 is raised together with the disc connecting unit 168 so that the multi-layered disc 156 is lifted up above the turntable 140.

Figure 10A:
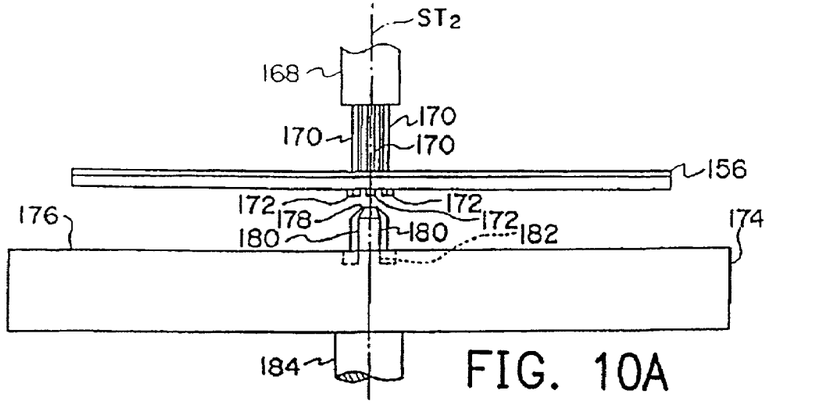
FIGS. 10A~10C are side views showing the transporting apparatus and the ultraviolet ray irradiation apparatus for the multi-layered disc according to the second embodiment of the invention.

Referring to FIG. 10A, as the multi-layered disc 156 is lifted up from the turntable 140, the disc transporting apparatus 138 rotates the rotational stage 164 towards the ultraviolet ray irradiation apparatus 136 (clockwise direction in FIG. 7), and the disc connecting unit 168 is moved to above the turntable 174 of the ultraviolet ray irradiation apparatus 136. At this time, the position of the rotational stage 164 is also adjusted in the rotational direction, so that the center of the disc connecting unit 168 is consistent with the axis $ST_2$ of the turntable 174.

On the other hand, as shown in FIG. 10A, a boss 178 is installed in a stand manner on the turntable 174 of the ultraviolet ray irradiation apparatus 136 for determining the position of the multi-layered disc 156. Similar to the boss 144 of the spin coater 134, three insertion holes 180 are formed on the outer surface of the boss 178. In addition, similar to the turntable 140 of the spin coater 134, a ring recess 182 is formed on the loading surface 176 of the turntable 174 around the bottom of the boss 178.

Figure 10B:
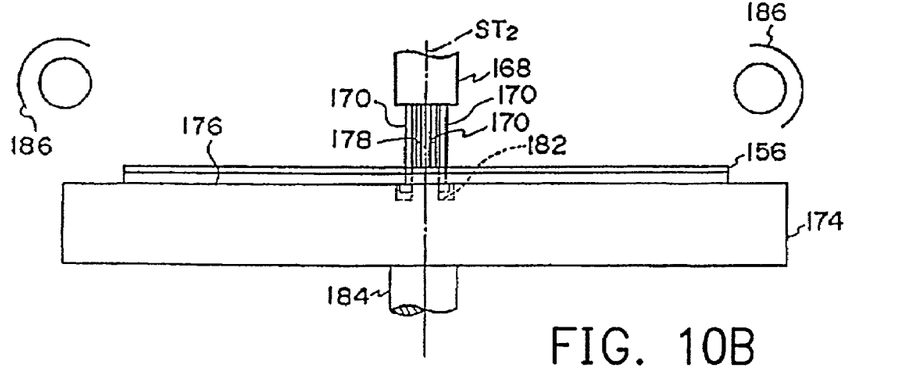

As the center of the disc connecting unit 168 becomes consistent with the axis $ST_2$ of the turntable 174, the rotational stage 164 is lowered together with the disc connecting unit 168. As shown in FIG. 10B, the multi-layered disc 156 hung by the fixers 170 below the disc connecting unit 168 is then loaded onto the loading surface 176 of the turntable 174. At this time, the three fixers 170 fixing the multi-layered disc 156 go down through the insertion holes 180 on the boss 178. Before the multi-layered disc 156 is loaded onto the turntable 174, the tips of the fixers 170 insert into the recess 182 of the turntable 174. Therefore, the disc connecting unit 168 can load the multi-layered disc 156 onto the turntable 174, wherein the three fixers 170 are not in contact with the boss 178 and the turntable 174.

As the multi-layered disc 156 is loaded onto the turntable 174, after the three fixers 170 are respectively moved by the disc connecting unit 168 from the fixing position to the standby position, the disc connecting unit 168 is raised together with the rotational stage 164, and the fixers are withdrawn from the center holes 128, 130 and detached from the multi-layered disc 156.

In the embodiment, the distance from the rotational shaft of the rotational stage 164 to the central axis $ST_1$ of the turntable 140 is consistent with the distance from the rotational shaft of the rotational stage 164 to the central axis $ST_2$ of the turntable 174. By only rotating the transporting arm 166 centered on the rotational stage 164, the central axis of the disc connecting unit 168 can be consistent with the axis $ST_1$ and the axis $ST_2$. However, when the axial distance is inconsistent, the transporting arm 166 can be expanded or contracted in its longitudinal direction, and the length of the transporting arm 166 can be adjusted while the transporting arm 166 rotates, so that the central axis of the disc connecting unit 168 can be consistent with the axis $ST_1$ and the axis $ST_2$. In addition, the supporting stage 162 itself can move forward and backward in the horizontal direction, and the distance from the supporting stage 162 to the spin coater 134 and the ultraviolet ray irradiation apparatus 136 can be adjusted while the transporting arm 166 rotates, so that the central axis of the disc connecting unit 168 can be consistent with the axis $ST_1$ and the axis $ST_2$.

Figure 10C:
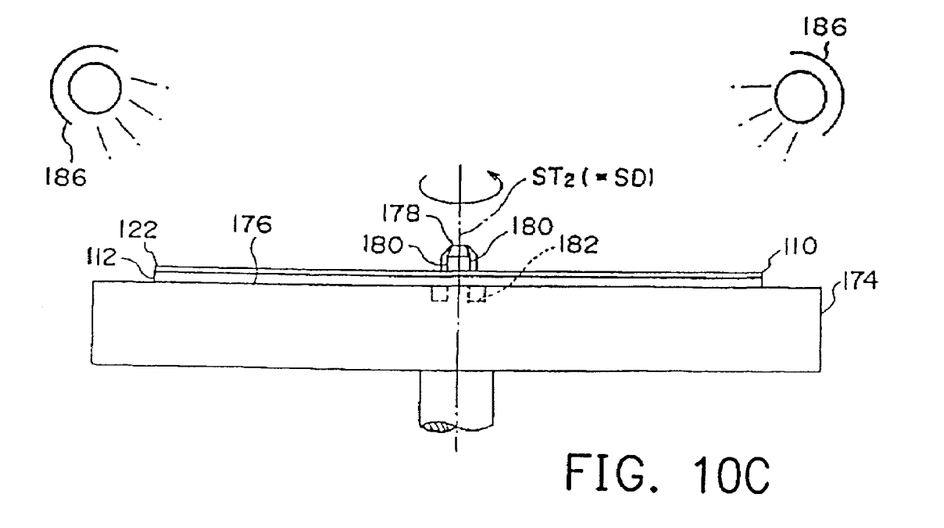

As shown in FIGS. 10A~10C, a rotational shaft 184 is connected to the central portion under the turntable 174 of the ultraviolet ray irradiation apparatus 136. The turntable 174 is rotatably supported by rotational shaft 184, and additionally, the turntable 174 is directly connected to a step motor (not shown), or through a torque transmission mechanism. Furthermore, according to the disc transporting apparatus 138 of the second embodiment, when stopping the turntables 140, 174 from rotating, by controlling the phase of the step motor (not shown) that drives the turntables 140, 174 respectively, the insertion holes 158, 180 can have a phase consistent with the fixers 170, so that the turntables 140, 174 can be always stopped from rotating.

As shown in FIGS. 10A~10C, ultraviolet lamps 186 are arranged above the turntable 174 in the ultraviolet ray irradiation apparatus 136. As the multi-layered disc 156 is loaded onto the turntable 174 and the turntable 174 begins to rotate, the ultraviolet lamps 186 irradiate ultraviolet rays with a predetermined wavelength to the multi-layered disc 156 on the turntable 174. The ultraviolet rays penetrate through the sheet 124 on the multi-layered disc 156 to the ultraviolet curing adhesive 126. Accordingly, a curing reaction of the ultraviolet curing adhesive 126 begins. As a predetermined curing time lapses, the thinned ultraviolet curing adhesive 126 between the sheet 124 and the disc substrate 112 is completely cured (hardened). As a result, the sheet 124 is adhered to the disc substrate 112, and at the same time, the cover layer 122 composed of the sheet 124 and the cured ultraviolet curing adhesive 126 is thus formed.

The multi-layered disc 156 whose ultraviolet curing adhesive 126 has been completely cured becomes an optical disc product 110 shown in FIG. 6. The optical disc 110 is transported to a transporting device such as a conveyer from the turntable 174, and then the optical disc 110 is transported by the transporting device to a storage room for temporary storage, or to a printing device for a printing label etc. Additionally, similar to the transportation from the turntable 140 to the turntable 174, when the optical disc 110 is transported from the turntable 174 to the transporting device, the disc transporting apparatus 138 can be used for transporting the optical disc 110. Alternatively, a transporting apparatus other than the disc transporting apparatus 138 can also be for transporting. At this time, because the curing of the ultraviolet curing adhesive 126 is completed and the sheet 124 is adhered to the disc substrate 112 with a sufficient strength, and therefore even though the sheet 124 of the optical disc 110 is sucked by a sucker so as to lift the optical disc 110 up to transport, no wrinkles or exfoliations occur on the sheet 124.

As described above, according to the method for transporting the multi-layered disc of the second embodiment, when the multi-layered disc 156 where the sheet is loaded onto the disc substrate 112 through the ultraviolet curing adhesive is transported from the turntable 140 to the turntable 174 by the disc transporting apparatus 138 before the ultraviolet curing adhesive between the sheet 124 and the disc substrate 112 is cured, the disc substrate 112 is fixed by the fixers 170 and the loading weight of the multi-layered disc is supported by the fixers 170. By lifting up and transporting the multi-layered disc using the transporting arm 166 of the disc transporting apparatus 138, the loading weight from the disc transporting apparatus 138 does not directly act on the sheet when transporting the multi-layered disc 156. Therefore, it can prevent the sheet 124 of the multi-layered disc 156 from wrinkles due to the loading weight of the disc transporting apparatus 138, and also prevent the sheet 124 from local exfoliations on the disc substrate 112.

Additionally, in the method for transporting the multi-layered disc of the second embodiment, it is only described that the multi-layered disc 156 is transported from the turntable 140 of the spin coater 134 to the turntable 174 of the ultraviolet ray irradiation apparatus, but the positions before or after transporting the multi-layered disc 156 are not limited. If the method for transporting the multi-layered disc 156 is suitable, even though the multi-layered disc 156 is lifted up to transport before the ultraviolet curing adhesive 126 is cured, it can also prevent wrinkles or exfoliations from occurring on the sheet of the multi-layered disc 156 when transporting. Moreover, the method for transporting the multi-layered disc of the second embodiment is also suitable for transporting the optical disc 10 in FIG. 1 from the turntable 36 of the spin coater 34 to another apparatus or place, such as the ultraviolet ray irradiation apparatus 52 etc.

According to the disc transporting apparatus 138 of the embodiment, the inner circumference of the disc substrate 112 is fixed by three fixers 170 and the disc connecting unit 168 is connected to the disc substrate 112. However, for example, the outer circumference of the disc substrate 112 can be fixed by plural fixers each having a claw that protrudes inwards and the disc connecting unit 168 is connected to the disc substrate 112. Furthermore, as described in the embodiment, the disc connecting unit 168 does not have to directly connect to the disc substrate 112. For example, the turntable 140 of the spin coater 140 can be attachable, by which the turntable 140 can be fixed by fixers and the disc connecting unit 168 is indirectly connected to the disc substrate 112. Most importantly, when the multi-layered disc 156 is lifted up, if the loading weight does not act directly from the disc transporting apparatus 138 to the sheet 124, any one of the configurations where the disc connecting unit 168 is connected to the disc substrate 112 and the structure of the disc connecting unit 168 can be used.

In the embodiment, the disc transporting apparatus 138 uses an arm-type device having the transporting arm 166 capable of rising, lowering and rotating. However, the structure of the disc transporting apparatus is not limited to the arm-type device. For example, the disc transporting apparatus can have a carrier capable of moving in two dimensions above the spin coater 134 and the ultraviolet ray irradiation apparatus 136, and a crane that is installed on the carrier to make the disc connecting unit be able to move in the up-and-down direction.

EXAMPLES

Following descriptions are examples based on the method for manufacturing the optical disc and the method for transporting the multi-layered disc.

Example 1

In the example 1, the disc substrate of the optical disc is formed by molding using a material of polycarbonate (PC), with a thickness of 1.2 mm, an outer radius of 120 mm. A guiding groove with a groove depth of 175 nm, a groove width of 500 nm and a track pitch of 1600 nm is formed on the recording surface of the disc substrate. In addition, a silver film with a thickness of 80 nm is used as a light reflection layer and is formed on the recording surface by a magnetron sputter. Furthermore, a thin film made of PET with a thickness of 62 $\mu$m is used as the sheet and is made to have the same surface shape as the disc substrate. In the example 1, on the disc substrate, a ring groove is formed on the inner side of the recording layer at the recording surface (inner ring groove). The inner ring groove is equivalent to the groove 30 of the optical disc 10 shown in FIGS. 1~5.

The above disc substrate is loaded onto the turntable of the spin coater. The turntable rotates at a low speed of 60 rpm and the ultraviolet curing adhesive is dropped to the recording surface of the disc substrate. The ultraviolet curing adhesive is then adhered to the inner side of the inner ring groove at the recording surface, and becomes a ring shape. The sheet is loaded onto the disc substrate through the ultraviolet curing adhesive. After the ultraviolet curing adhesive is pressed by the sheet to spread to the inner ring groove, the turntable rotates at a high speed of 4400 rpm, so that the ultraviolet curing adhesive between the sheet and the disc substrate is extended to the outer side by the centrifugal force, and the surplus ultraviolet curing adhesive is scattered to the outer side of the multi-layered disc.

After finishing the spin-coating, the disc connecting unit of the disc transporting apparatus is coupled to the disc substrate of the multi-layered disc, the multi-layered disc is then transported from the turntable of the spin coater to the turntable of the ultraviolet ray irradiation apparatus. The turntable is rotated at a low speed and the ultraviolet rays from the ultraviolet lamps irradiate so that the ultraviolet curing adhesive between the sheet and the disc substrate is cured. Afterwards, the sheet is cut by a cutting blade along the inner ring groove on the recording surface to form a circular opening, and the non-adhered portion of the sheet located at the inner side of the inner ring groove is removed from the disc substrate. The sheet of the optical disc made by the above process can be uniformly adhered onto the disc substrate, and therefore local exfoliations on the sheet and the ultraviolet curing adhesive adhered on the surface of the cover layer will not be observed.

Comparison Example 1

In comparison example 1, except that no inner ring groove is formed on the recording surface of the disc substrate, is the same as example 1. In addition, the sheet has the same shape as the sheet that is cut to form the opening in example 1. In the comparison example 1, the disc substrate is loaded onto the turntable and the ultraviolet curing adhesive is supplied to the recording surface of the disc substrate. At this time, the amount and the supply position of the ultraviolet curing adhesive in the radial direction with respect to the disc substrate are the same as the example 1. The sheet is loaded onto the disc substrate through the ultraviolet curing adhesive, and the ultraviolet curing adhesive is pressed by the sheet to spread to the inner side. However, the ultraviolet curing adhesive is not uniformly spread to the inner side of the sheet. Next, the turntable of the spin coater is rotated under the same condition as the example 1, and the ultraviolet curing adhesive is extended to the outer side by the centrifugal force. As a result, the surplus ultraviolet curing adhesive is scattered to the outer side of the multi-layered disc.

After finishing the spin-coating, the disc connecting unit of the disc transporting apparatus is coupled to the disc substrate of the multi-layered disc, the multi-layered disc is then transported from the turntable of the spin coater to the turntable of the ultraviolet ray irradiation apparatus. The turntable is rotated at a low speed and the ultraviolet rays from the ultraviolet lamps irradiate so that the ultraviolet curing adhesive between the sheet and the disc substrate is cured.

Regarding the optical disc in the comparison example 1, because the non-adhered portion on the inner circumference of the sheet can seen by the naked eye, the appearance quality is worse than that of the optical disc made by the example 1. In addition, if the optical disc made by the comparison example 1 is repeatedly loaded to an optical disc apparatus, exfoliations occur from the inner circumference of the sheet.

Comparison Example 2

In the comparison example 2, except that no inner ring groove is formed on the recording surface of the disc substrate, others are the same as the example 1. In addition, the sheet has the same shape as the sheet that is cut to form the opening in the example 1. In the comparison example 2, the disc substrate is loaded onto the turntable and the ultraviolet curing adhesive is supplied to the recording surface of the disc substrate. At this time, the amount of the ultraviolet curing adhesive in the radial direction with respect to the disc substrate is the same as the example 1, but the supply position of the ultraviolet curing adhesive in the radial direction with respect to the disc substrate is displaced inward with respect to the supply position in the example 1. The ultraviolet curing adhesive is pressed by the sheet to spread to the inner side. At this time, the surplus ultraviolet curing adhesive is slightly overflowed to the inner side from between the sheet and the disc substrate. Next, the turntable of the spin coater is rotated under the same condition as example 1, and the ultraviolet curing adhesive is extended to the outer side by the centrifugal force. As a result, the surplus ultraviolet curing adhesive is scattered to the outer side of the multi-layered disc.

After finishing the spin-coating, the disc connecting unit of the disc transporting apparatus is coupled to the disc substrate of the multi-layered disc, the multi-layered disc is then transported from the turntable of the spin coater to the turntable of the ultraviolet ray irradiation apparatus. The turntable is rotated at a low speed and the ultraviolet rays from the ultraviolet lamps irradiate so that the ultraviolet curing adhesive between the sheet and the disc substrate is cured.

In the optical disc made by the comparison example 2, the ultraviolet curing adhesive that overflows to the inner side from between the sheet and the disc substrate will adhere radially on the disc surface centered on the center hole. The ultraviolet curing adhesive that adheres on the disc surface due to the irradiation of the ultraviolet rays becomes radial blots. Therefore, the appearance quality of the optical disc of the comparison example 2 is worse than that of the optical disc of the example 1. In addition, the radial bolts formed due to the ultraviolet curing adhesive will create diffusion and degradation of the laser beam, which are reasons for the occurrence of the recording/reproducing errors for the optical disc.

Comparison Example 3

In comparison example 3, the sheet and the disc substrate used are the same as example 1. In comparison example 3, the disc substrate is loaded onto the turntable and the ultraviolet curing adhesive is supplied to the recording surface of the disc substrate. At this time, the amount and the supply position of the ultraviolet curing adhesive in the radial direction with respect to the disc substrate are the same as example 1. The sheet is loaded onto the disc substrate through the ultraviolet curing adhesive, and the ultraviolet curing adhesive is pressed by the sheet to spread to the inner side. Next, the turntable of the spin coater is rotated under the same condition as example 1, and the ultraviolet curing adhesive is extended to the outer side by centrifugal force. As a result, the surplus ultraviolet curing adhesive is scattered to the outer side of the multi-layered disc.

After finishing the spin-coating, the disc connecting unit of the disc transporting apparatus is coupled to the disc substrate of the multi-layered disc, the multi-layered disc is then transported from the turntable of the spin coater to the turntable of the ultraviolet ray irradiation apparatus. The turntable is rotated at a low speed and the ultraviolet rays from the ultraviolet lamps irradiate so that the ultraviolet curing adhesive between the sheet and the disc substrate is cured. Afterwards, the sheet is cut by a cutting blade along the inner ring groove on the recording surface to form a circular opening, and the non-adhered portion of the sheet located at the inner side of the inner ring groove is removed from the disc substrate. In the optical disc made by the above process, the ultraviolet curing adhesive adhered onto the surface of the cover layer is not observed, but exfoliations occur in the vicinity of the portion sucking the sheet. As a result, air enters between the sheet and the disc substrate at the exfoliated portions.

As described above, according to the method for manufacturing the optical disc of the invention, the sheet from the inner circumference to the outer circumference can be simply adhered onto the disc substrate by the adhesive. Additionally, when adhering the sheet, the invention can prevent the surplus adhesive from being adhered to the disc surface from damaging the quality.

Furthermore, according to the method for transporting the multi-layered disc, the multi-layered disc can be transported before the adhesive between the disc substrate and the sheet is cured without creating wrinkles and exfoliations on the sheet.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A method for transporting a multi-layered disc, in a process to make an optical disc, the method comprising:
    providing a transporting apparatus comprising a fixer with a claw;
    forming the multi-layer disc, wherein the multi-layer disc includes an information recording layer is formed between a disc substrate and a transparent cover layer thinner than the disc substrate, and the cover layer is formed by adhering a sheet, which sheet is transparent, to the disc substrate by an adhesive;
    inserting the fixer through a center hole of the disc substrate to couple the claw with the lower surface of the disc substrate; and
    lifting and transporting the multi-layered disc with the claw coupled to the lower surface of the disc substrate but not on an upper surface of the multi-layered disc substrate, such that a loading weight of the multi-layered disc is supported by the transporting apparatus, wherein the transporting occurs in a state where the sheet is loaded onto the disc substrate through the adhesive while the adhesive is in an uncured state.

2. The method of claim 1, wherein in the transporting apparatus, when transporting the multi-layered disc, a plurality of fixers is inserted into a center hole penetrating through the disc substrate, a circumference of the center hole is fixed by the fixers so that the transporting apparatus is connected to the disc substrate.

3. The method of claim 1, wherein an ultraviolet curing adhesive is used as the adhesive for adhering the sheet to the disc substrate, and the transporting apparatus transports the multi-layered disc from a turntable of a spin coater to an ultraviolet ray irradiation apparatus.

4. The method of claim 1, wherein a thickness of the sheet is in a range of 30–150 microns.

* * * * *